US010392943B2

(12) United States Patent
Lewis et al.

(10) Patent No.: US 10,392,943 B2
(45) Date of Patent: Aug. 27, 2019

(54) FILM COOLING HOLE INCLUDING OFFSET DIFFUSER PORTION

(71) Applicants: United Technologies Corporation, Farmington, CT (US); The Penn State Research Foundation, University Park, PA (US)

(72) Inventors: Scott D. Lewis, Vernon, CT (US); Stephen Lynch, State College, PA (US); Shane Haydt, State College, PA (US)

(73) Assignees: United Technologies Corporation, Farmington, CT (US); The Penn State Research Foundation, University Park, PA (US)

( * ) Notice: Subject to any disclaimer, the term of this patent is extended or adjusted under 35 U.S.C. 154(b) by 583 days.

(21) Appl. No.: 15/355,173

(22) Filed: Nov. 18, 2016

(65) Prior Publication Data

US 2018/0230811 A1 Aug. 16, 2018

Related U.S. Application Data

(60) Provisional application No. 62/258,097, filed on Nov. 20, 2015.

(51) Int. Cl.
*F01D 5/18* (2006.01)

(52) U.S. Cl.
CPC .......... *F01D 5/186* (2013.01); *F05D 2230/12* (2013.01); *F05D 2250/19* (2013.01); *F05D 2250/312* (2013.01); *F05D 2250/314* (2013.01); *F05D 2260/202* (2013.01); *Y02T 50/676* (2013.01)

(58) Field of Classification Search
CPC .. F01D 5/186; F05D 2250/19; F05D 2230/12; F05D 2250/312; F05D 2250/314; F05D 2260/202; Y02T 50/676
See application file for complete search history.

(56) References Cited

U.S. PATENT DOCUMENTS

| | | | |
|---|---|---|---|
| 4,738,588 A | 4/1988 | Field | |
| 6,368,060 B1 | 4/2002 | Fehrenbach et al. | |
| 6,969,817 B2 * | 11/2005 | Lee | B23H 7/26 204/224 M |
| 8,057,180 B1 | 11/2011 | Liang | |

(Continued)

FOREIGN PATENT DOCUMENTS

| | | |
|---|---|---|
| EP | 0227582 | 7/1987 |
| EP | 2574726 | 4/2013 |

OTHER PUBLICATIONS

The Extended European Search Report for EP Application No. 16199208.6, dated May 11, 2017.

*Primary Examiner* — Hieu T Vo
*Assistant Examiner* — Arnold Castro
(74) *Attorney, Agent, or Firm* — Carlson, Gaskey & Olds, P.C.

(57) ABSTRACT

A component for a gas turbine engine including a body having at least one internal cooling cavity and a plurality of film cooling holes disposed along a first edge of the body. At least one of the film cooling holes includes a metering section defining an axis, and a diffuser section having a centerline. The centerline of the diffuser section is offset from the axis of the metering section.

18 Claims, 3 Drawing Sheets

(56) References Cited

U.S. PATENT DOCUMENTS

| | | | | |
|---|---|---|---|---|
| 8,925,201 | B2 * | 1/2015 | Frederick | F01D 5/02 29/889.2 |
| 9,273,560 | B2 | 3/2016 | Gleiner et al. | |
| 9,376,920 | B2 | 6/2016 | McBrien et al. | |
| 2005/0123401 | A1 | 6/2005 | Bunker et al. | |
| 2006/0023249 | A1 | 2/2006 | Simpson | |
| 2009/0074588 | A1 | 3/2009 | Scott | |
| 2010/0068033 | A1 | 3/2010 | Liang | |
| 2011/0036819 | A1 | 2/2011 | Munzer et al. | |
| 2011/0293423 | A1 * | 12/2011 | Bunker | F01D 5/186 416/95 |
| 2012/0051941 | A1 * | 3/2012 | Bunker | F01D 5/186 416/97 R |
| 2013/0078110 | A1 * | 3/2013 | Boyer | F01D 5/186 416/97 R |
| 2013/0156662 | A1 | 6/2013 | Walravens et al. | |
| 2017/0335691 | A1 * | 11/2017 | Crites | F01D 5/186 |
| 2018/0073369 | A1 * | 3/2018 | Lewis | F01D 5/186 |

* cited by examiner

FILM COOLING HOLE INCLUDING OFFSET DIFFUSER PORTION

CROSS-REFERENCE TO RELATED APPLICATION

This application claims priority to U.S. Provisional Application No. 62/258,097 filed Nov. 20, 2015.

TECHNICAL FIELD

The present disclosure relates generally to film cooling holes, and specifically film cooing holes for gas path components of a gas turbine engine.

BACKGROUND

Gas turbine engine include a compressor for compressing air, a combustor for mixing the compressed air with a fuel and igniting the mixture, and a turbine across which the resultant combustion products are expanded. As a result of the combustion, temperatures within the turbine engine gas path connecting each of the sections are extremely high. With some components the extreme temperatures require active cooling systems to keep the components exposed to the gaspath (referred to as gaspath components) below a maximum temperature and prevent damage to the component.

In some exemplary gaspath components, such as rotors and blades, among others, the active cooling takes the form of a film cooling process. In film cooling, a series of holes eject a stream of coolant, such as air, along a surface of the gaspath component being cooled. The stream of coolant simultaneously cools the exterior surface and provides a buffer zone prevent at least a portion of the high temperature gasses in the gaspath from contacting the gaspath component. Film cooling can be utilized in conjunction with other active cooling systems, or on it's own to cool a gaspath component depending on the needs of the gaspath component.

SUMMARY OF THE INVENTION

In one exemplary embodiment a component for a gas turbine engine includes a body having at least one internal cooling cavity and a plurality of film cooling holes disposed along a first edge of the body, at least one of the film cooling holes including a metering section defining an axis, and a diffuser section having a centerline, the centerline of the diffuser section being offset from the axis of the metering section.

In another exemplary embodiment of the above described component for a gas turbine engine the centerline of the diffuser section is offset from the axis of the metering section in an upstream direction.

In another exemplary embodiment of any of the above described components for a gas turbine engine the centerline of the diffuser section is offset from the axis of the metering section by at least 12.5% of the diameter of the metering section.

In another exemplary embodiment of any of the above described components for a gas turbine engine the centerline of the diffuser section is offset from the axis of the metering section by at least 25% of the diameter of the metering section.

In another exemplary embodiment of any of the above described components for a gas turbine engine the centerline of the diffuser section is offset from the axis of the metering section by approximately 25% of the diameter of the metering section.

In another exemplary embodiment of any of the above described components for a gas turbine engine wherein each of the film cooling holes has a blowing ratio of approximately 1.0.

In another exemplary embodiment of any of the above described components for a gas turbine engine the metering section is cylindrical and has a circular cross section normal to the axis.

In another exemplary embodiment of any of the above described components for a gas turbine engine the centerline of the diffuser section and the axis of the metering section are in parallel.

In another exemplary embodiment of any of the above described components for a gas turbine engine the at least one film cooling hole is a 7-7-7 film cooling hole.

In another exemplary embodiment of any of the above described components for a gas turbine engine wherein the at least one film cooling hole is a 10-10-10 film cooling hole.

In another exemplary embodiment of any of the above described components for a gas turbine engine the upstream direction is a forward offset direction, relative to an expected fluid flow across an exterior surface of the body.

An exemplary method for manufacturing a film cooled article includes offsetting a diffuser of at least one film cooling hole relative to a metering portion of the at least one film cooling hole.

In a further example of the above described exemplary method for manufacturing a film cooled article the metering portion is manufactured in a first manufacturing step, and the diffuser section is manufactured in a second manufacturing step distinct form the first manufacturing step.

In a further example of any of the above described exemplary methods for manufacturing a film cooled article the metering portion and the diffuser portion are simultaneously manufactured.

In a further example of any of the above described exemplary methods for manufacturing a film cooled article offsetting the diffuser comprising manufacturing the diffuser such that a centerline of the diffuser is not collinear with an axis defined by the metering portion.

A further example of any of the above described exemplary methods for manufacturing a film cooled article further includes maintaining the centerline of the diffuser in parallel with the axis defined by the metering portion.

A further example of any of the above described exemplary methods for manufacturing a film cooled article further includes manufacturing the diffuser such that the centerline of the diffuser is skew relative to the axis defined by the metering portion.

A further example of any of the above described exemplary methods for manufacturing a film cooled article further includes offsetting the diffuser upstream of the metering portion.

A further example of any of the above described exemplary methods for manufacturing a film cooled article further includes offsetting the centerline of the diffuser section from the axis of the metering portion by at least 12.5% of the diameter of the metering section.

A further example of any of the above described exemplary methods for manufacturing a film cooled article further includes offsetting the centerline of the diffuser section from the axis of the metering portion by at least 25% of the diameter of the metering section.

A further example of any of the above described exemplary methods for manufacturing a film cooled article further includes offsetting the centerline of the diffuser section from the axis of the metering portion by approximately 25% of the diameter of the metering section.

These and other features of the present invention can be best understood from the following specification and drawings, the following of which is a brief description.

DETAILED DESCRIPTION OF AN EMBODIMENT

Figure 1:
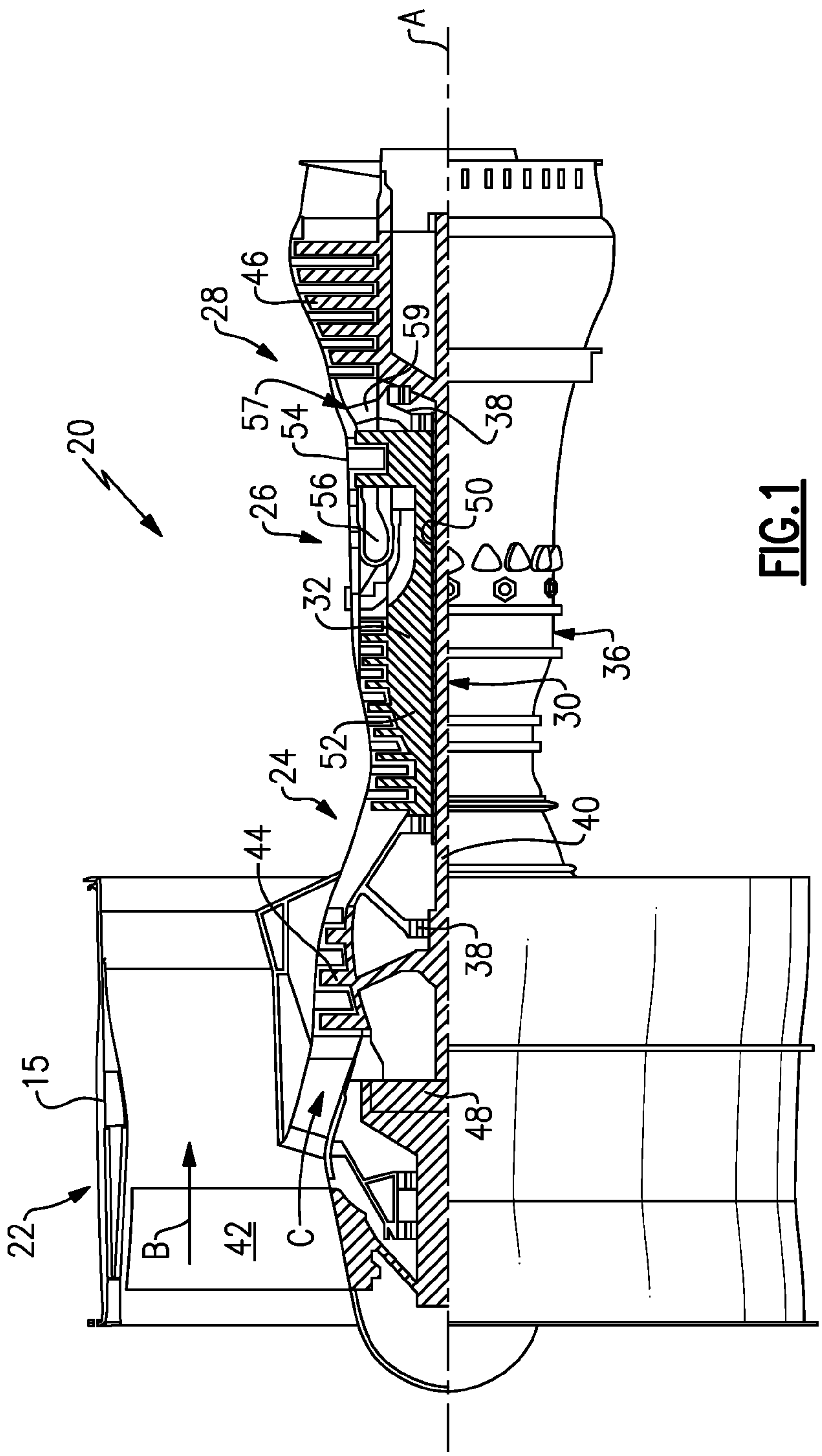
FIG. 1 schematically illustrates a gas turbine engine including multiple gaspath components.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10668 meters). The flight condition of 0.8 Mach and 35,000 ft (10668 m), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/s).

In order to compensate for the extreme temperatures generated by the combustion, gaspath components, such as the blades and stators at an inlet of the turbine section 28 include active cooling systems. Among other cooling techniques the active cooling systems utilize a film cooling technique.

Figure 2:
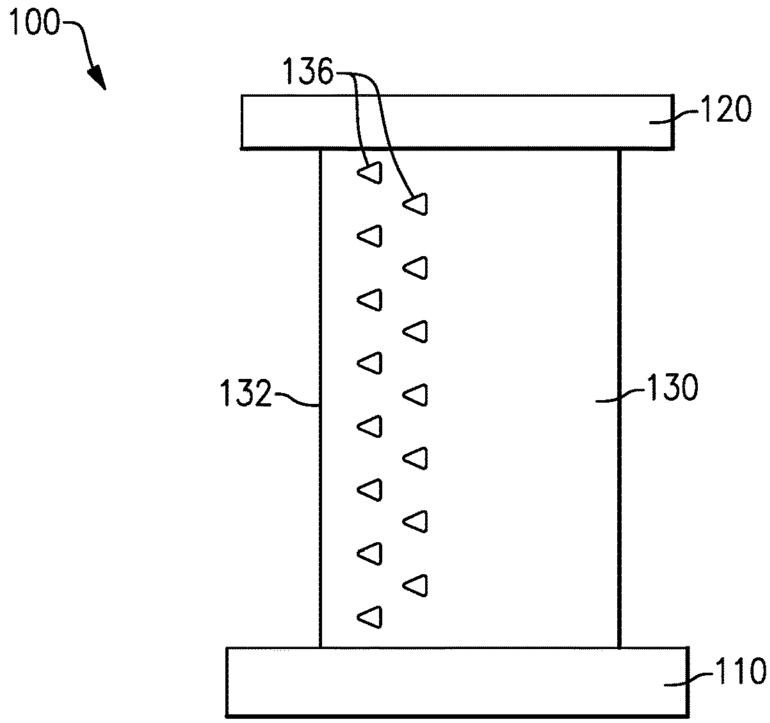
FIG. 2 schematically illustrates an exemplary gaspath component including a series of film cooling holes.

With continued reference to FIG. 1, FIG. 2 illustrates an exemplary film cooled gaspath component 100. The exemplary film cooled gaspath component 100 is a stator, however one of skill in the art having the benefit of this disclosure will understand that the shaped film cooling holes described herein can be utilized in any type of film cooled component, and are not limited to stators.

The film cooled component 100 includes a radially inward platform section 110, a radially outward platform section 120, and a vane portion 130 extending between the platforms 110, 120. The vane portion 130 includes a leading edge 132 positioned at a fore most edge of the vane portion 130, relative to an expected direction of fluid flow through the engine. Similarly, the vane portion 130 includes a trailing edge 134 positioned at an aft most edge of the vane portion 130, relative to an expected direction of fluid flow through the engine.

Along the leading edge 132 are multiple rows of film cooling holes 136. The film cooling holes 136 are connected to an internal plenum that receives a cooling fluid from either the radially outward platform 120 or the radially inward platform 110. The cooling fluid is pressurized and is forced out of the film cooling hole along the surface of the vane portion 130. The cooling fluid forms a layer of fluid, or a film, that adheres to the vane portion 130 and simultaneous cools the vane portion 130 and provides a buffer against hot gasses within the gaspath contacting the vane portion 130.

Figure 3:
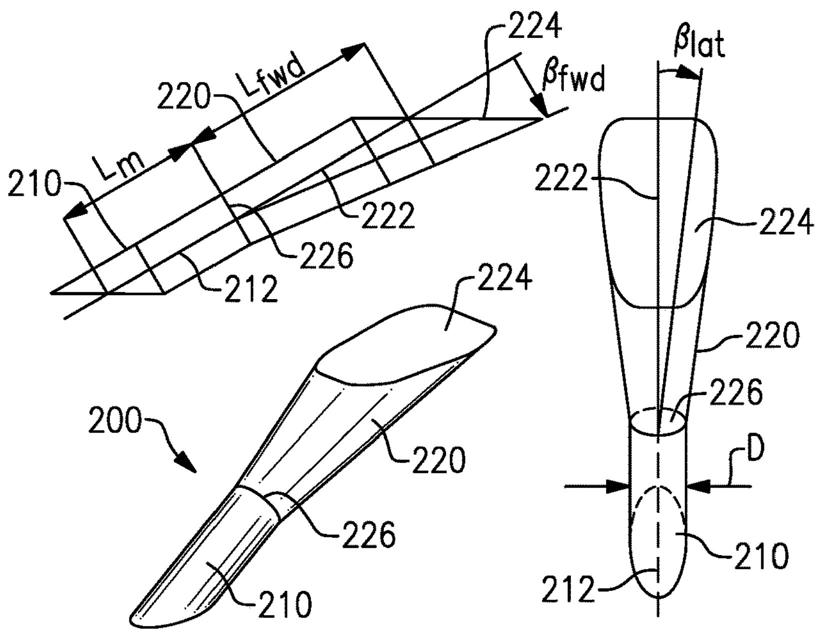
FIG. 3 schematically illustrates a negative space of one exemplary film cooling hole.

With continued reference to FIGS. 1 and 2, FIG. 3 schematically illustrates a negative space of one exemplary film cooling hole 200. The film cooling hole 200 is a shaped film cooling holes. Shaped film cooling generally consist of a metering section 210 through the material of the gaspath component and a diffuser 220 to spread coolant over the surface of the gaspath component. In order to spread the coolant the diffuser 220 is angled outward from the metering section 210, and expands the coolant. In one example the diffuser 220 is angled at 7 degrees in the forward and lateral directions, and is referred to as a 7-7-7 film cooling hole. In an alternate example, the diffuser 220 is angled at 10 degrees in the forward and lateral directions and is referred to as a 10-10-10 film cooling hole. The intentional offset between the diffuser 220 and the metering section 210 is applicable to both 7-7-7 holes and 10-10-10 holes, as well as any number of other film cooling hole styles, as will be understood by one of skill in the art.

These metering section 210 and the diffuser 220 are typically created using distinct machining actions. In some examples the holes are created using electrical discharge machining, although any alternative machining process can be used to similar effect. Conventional film cooling holes are designed such that a centerline 222 of the diffuser section, and an axis 212 of the metering section 210 are collinear. The centerline 222 of the diffuser 220 is defined as a line drawn from a midpoint of the opening intersecting with the metering section 210 to a midpoint of the opening in the exterior of the gas path component 100 (see FIG. 1).

In the illustrated example, the metering section 210 is generally cylindrical with a circular cross section parallel to an axis 212 defined by the cylinder. In alternative examples, the metering section 210 can be formed with alternative cross sectional shapes, such as regular polygons, and function in a similar manner. The metering section 210 provides a through hole to the pressurized internal cavity and allows cooling fluid to be passed from the internal cavity to an exterior surface of the gas path component 100. In some examples, the pressurized internal cavity is an impingement cavity The diffuser 220 is an angled hole with a wider opening 224 at an outlet end on the surface of the gas path component and a narrower opening 226, approximately the same size as the metering section 210 cross section interior to the gas path component. By aligning the axis 212 of the metering section 220 with a centerline 222 of the diffuser 220, the diffuser 220 is able to expand and direct the cooling gas emitted from the metering section 220 and thereby enhance the film cooling layer.

Figure 4:
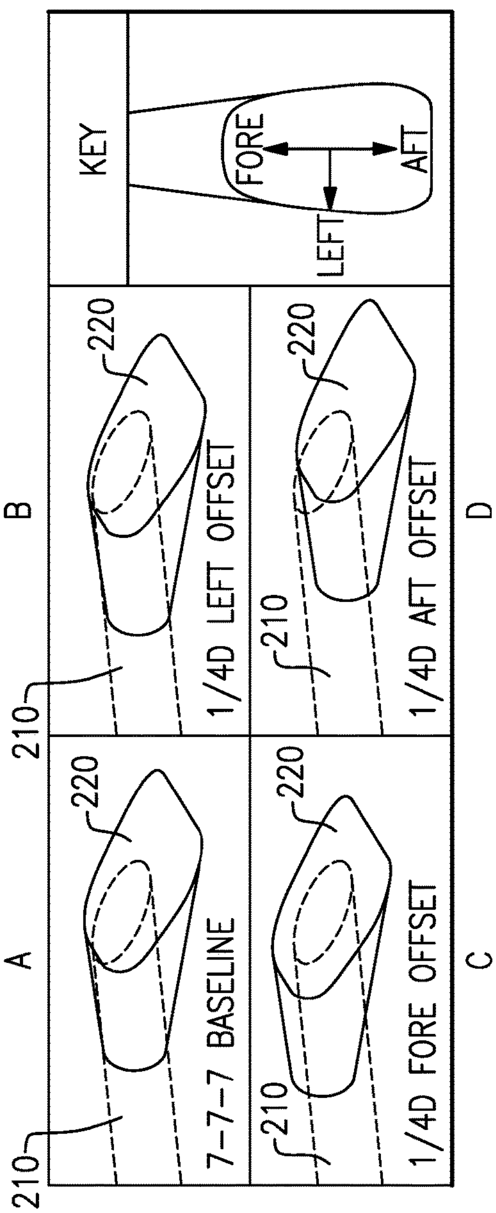
FIG. 4 schematically illustrates multiple specific arrangements of the negative space illustrated in FIG. 3.
Figure 5:
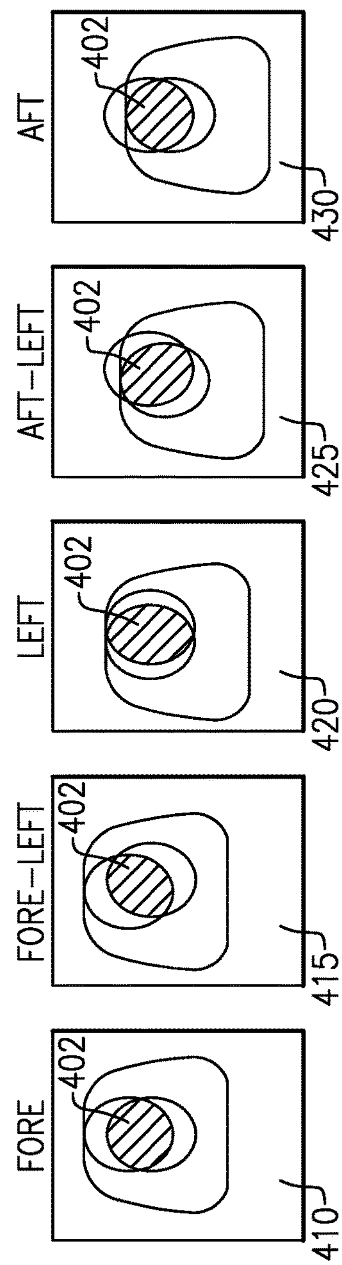
FIG. 5 schematically illustrates a surface view of multiple specific arrangements of a film cooling hole.

Since the metering section 210 and the diffuser 220 are machined into the gas path component via separate machining actions, it is possible to include an intentional offset between the axis 212 of the metering section 210 and the centerline 222 of the diffuser 220. With continued reference to FIG. 3, and with like numerals indicating like elements, FIGS. 4 and 5 schematically illustrate exemplary intentional offsets. Included in the illustration of FIG. 5 is a key illustrating the terms “fore”, “aft”, and “left” as they are applied to a given film cooling hole 200. Illustration A shows a film cooling hole 200 where the diffuser 220 and the metering section 210 are not offset. Illustration B shows a diffuser 220 that is offset left by one quarter of the diameter of the circular cross section of the metering portion 210. Illustration C shows a diffuser 220 that is offset forward by one quarter of the diameter of the circular cross section of the metering portion 210. Illustration D shows a diffuser 220 that is offset aftward by one quarter of the diameter of the metering portion 210. In some examples, the intentional offset will result in the centerline 222 and the axis 210 being parallel, but not collinear. In other examples, the offset can include a rotation of the diffuser section, and the centerline 222 and the axis 210 can be skew. While referred to herein by their relationship to the diameter of the circular cross section of the film cooling hole, one of skill in the art will understand that in the alternative examples using differently shaped metering sections, the diameter referred to is a hydraulic diameter.

In a similar vein, FIG. 5 illustrates view of five different offsets at the surface of the gaspath component, with view 410 corresponding to illustration C of FIG. 4, view 420 corresponding to illustration B of FIG. 4, and 430 corresponding to illustration D of FIG. 4. It is also recognized that any of the offsets described above can be combined with another offset. By way of example, view 415 is a combination of the offsets of views 410 and 420, alternately referred to as a fore-left offset. In another example, view 425 is a combination of views 420 and 430, alternately referred to as an aft-left offset. When including an intentional offset, the diffuser 220 is not aligned with the cross section of the metering section 210. As a result, the flow of coolant through the metering section 210 into the diffuser 220, and thus creating the film on the gaspath component, is restricted to the shaded region 402.

Further, while illustrated in the exemplary embodiments as 90 degree increments for the offsets, one of skill in the art will understand that an offset can be made according to any known increment and achieve a desired purpose, with the magnitude of the offset and the angle of the offset being determined by the specific needs of the given application.

Offsetting the diffuser 220 from the metering section 21 affects the disbursement of the cooling fluid along the surface of the gas path component including the film cooling hole 200, and has a corresponding effect on the efficacy of the film cooling.

In some examples, such as the illustrated aft shifts of FIGS. 4 and 5, ideal cooling is achieved by shifting the diffuser 220 upstream relative to an expected fluid flow through the gas path of the turbine engine in which the gas path component is located. Shifting the diffuser 220 upstream increases the cooling capabilities of the film cooling system. In yet further examples, the diffuser 220 is shifted upstream by one quarter (25%) of the diameter of the metering section 210. In other examples, ideal cooling is achieved by shifting the diffuser 220 upstream by one eighth (12.5%) of the diameter of the metering section 210. In other examples, the diffuser 220 is shifted by an amount within the range of one eight to one quarter of the diameter of the metering section 210. In further alternative examples the diffuser 210 can be shifted upstream by any suitable amount, and the shifting is not limited to the range of one eight to one quarter of the diameter of the metering section 210.

Another factor that impacts the effectiveness of the cooling provided by any given film cooling hole is the blowing ratio of the cooling hole. The blowing ratio is a number determined by $\rho_c U_c \rho_\infty U_\infty$, where $\rho_c$ is the density of the cooling fluid, $U_\infty$ is the velocity of the cooling fluid passing through the coolant hole, $\rho_\infty$, is the density of the fluid in the gaspath, and $U_\infty$ is the velocity of the fluid in the gaspath. In some examples, the film cooling provided is most effective when the blowing ratio is 1.0, with the cooling effectiveness decreasing the farther the film gest from the originating film cooling hole.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A component for a gas turbine engine comprising:
a body having at least one internal cooling cavity; and
a plurality of film cooling holes disposed along a first edge of said body, at least one of the film cooling holes including a metering section defining an axis, and a diffuser section having a centerline, the centerline of the diffuser section being offset from the axis of the metering section in an upstream direction by at least 12.5% of the diameter of the metering section.

2. The component of claim 1, wherein the diffuser section includes a diverging cross section.

3. The component of claim 2, wherein the diverging cross section extends an entire length of the diffuser section.

4. The component of claim 1, wherein the centerline of the diffuser section is offset from the axis of the metering section by at least 25% of the diameter of the metering section.

5. The component of claim 4, wherein the centerline of the diffuser section is offset from the axis of the metering section by approximately 25% of the diameter of the metering section.

6. The component of claim 1, wherein each of the film cooling holes has a blowing ratio of approximately 1.0.

7. The component of claim 1, wherein the metering section is cylindrical and has a circular cross section normal to the axis.

8. The component of claim 1, wherein the centerline of the diffuser section and the axis of the metering section are in parallel.

9. The component of claim 1, wherein the at least one film cooling hole is a 7-7-7 film cooling hole.

10. The component of claim 1, wherein the at least one film cooling hole is a 10-10-10 film cooling hole.

11. The component of claim 1, wherein the upstream direction is a forward offset direction, relative to an expected fluid flow across an exterior surface of the body.

12. A method for manufacturing a film cooled article comprising:
offsetting a diffuser of at least one film cooling hole relative to a metering portion of the at least one film cooling hole such that a centerline of the diffuser is not collinear with an axis defined by the metering portion, and such the diffuser is offset upstream of the metering portion by at least 12.5%.

13. The method of claim 12, wherein said metering portion is manufactured in a first manufacturing step, and said diffuser section is manufactured in a second manufacturing step distinct form said first manufacturing step.

14. The method of claim 12, wherein said metering portion and said diffuser portion are simultaneously manufactured.

15. The method of claim 12, further comprising maintaining the centerline of the diffuser in parallel with the axis defined by the metering portion.

16. The method of claim 12, further comprising manufacturing the diffuser such that the centerline of the diffuser is skew relative to the axis defined by the metering portion.

17. The method of claim 12, further comprising offsetting the centerline of the diffuser section from the axis of the metering portion by at least 25% of the diameter of the metering section.

18. The method of claim 17, further comprising offsetting the centerline of the diffuser section from the axis of the metering portion by approximately 25% of the diameter of the metering section.

* * * * *